US009357710B2

(12) United States Patent
Deppermann et al.

(10) Patent No.: US 9,357,710 B2
(45) Date of Patent: Jun. 7, 2016

(54) INTELLIGENT SELECTION AND REMAPPING OF ELLEPOTS

(75) Inventors: Kevin L. Deppermann, St. Charles, MO (US); Dario Bernacchi, Kihei, HI (US); Matthew J. Weis, St. Louis, MO (US); Travis J. Frey, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 535 days.

(21) Appl. No.: 13/637,513

(22) PCT Filed: Mar. 17, 2011

(86) PCT No.: PCT/US2011/028785
§ 371 (c)(1),
(2), (4) Date: Jan. 8, 2013

(87) PCT Pub. No.: WO2011/119402
PCT Pub. Date: Sep. 29, 2011

(65) Prior Publication Data
US 2013/0104454 A1     May 2, 2013

Related U.S. Application Data

(60) Provisional application No. 61/317,977, filed on Mar. 26, 2010.

(51) Int. Cl.
*A01G 9/08* (2006.01)
*A01G 1/00* (2006.01)
*A01G 9/10* (2006.01)

(52) U.S. Cl.
CPC .............. *A01G 1/001* (2013.01); *A01G 9/088* (2013.01); *A01G 9/108* (2013.01)

(58) Field of Classification Search
CPC ....... A01G 1/001; A01G 23/02; A01G 9/088; A01G 9/108
USPC ................... 47/58.1 R, 58.1 SE, 1.01 P, 65
See application file for complete search history.

(56) References Cited

U.S. PATENT DOCUMENTS 3,799,078 A * 3/1974 Blackmore et al. ........... 111/100
4,408,549 A * 10/1983 Qvarnstrom .................. 111/100
(Continued)

OTHER PUBLICATIONS

International Search Report from corresponding PCT/US2011/028785 mailed May 20, 2011.

*Primary Examiner* — David Parsley
*Assistant Examiner* — Morgan T Barlow
(74) *Attorney, Agent, or Firm* — Polster Lieder

(57) ABSTRACT

In various embodiments, a method for removing selected ellepots from a plurality of germination ellepot trays and remapping the selected ellepots to a planting ellepot tray is provided. The method can include placing one of a plurality of germination ellepot trays onto an ellepot ejection dock of an ellepot workstation. Each germination ellepot tray comprises an array of ellepot receptacles having an ellepot disposed in each receptacle, wherein each ellepot is populated with a plant germinating therein. The method can additionally include, acquiring tray information identifying the respective germination ellepot tray, and automatically dislodging one or more selected populated ellepots from the respective germination ellepot tray utilizing the acquired germination ellepot tray information. Subsequently, each dislodged populated ellepot is sequentially transferred from the respective germination ellepot tray to one of a plurality of receptacles of a planting ellepot tray.

8 Claims, 6 Drawing Sheets

(56) References Cited

U.S. PATENT DOCUMENTS

| | | | |
|---|---|---|---|
| 5,048,434 A | 9/1991 | Forster et al. | |
| 7,070,740 B1 | 7/2006 | Matson et al. | |
| 8,028,469 B2* | 10/2011 | Deppermann et al. | 47/14 |
| 8,519,297 B2* | 8/2013 | Cope | 219/121.6 |
| 2004/0237386 A1* | 12/2004 | Madsen et al. | 47/1.01 P |
| 2006/0162251 A1* | 7/2006 | Yamaguchi | 47/58.1 SE |
| 2008/0243392 A1 | 10/2008 | Fuessley et al. | |
| 2008/0317279 A1* | 12/2008 | Deppermann et al. | 382/100 |
| 2009/0025288 A1* | 1/2009 | Deppermann et al. | 47/58.1 SE |
| 2009/0155878 A1* | 6/2009 | Becker et al. | 435/173.9 |
| 2009/0291096 A1 | 11/2009 | Phelps et al. | |
| 2010/0044381 A1* | 2/2010 | Goldman | 220/507 |
| 2011/0195866 A1* | 8/2011 | Deppermann et al. | 506/12 |

* cited by examiner

INTELLIGENT SELECTION AND REMAPPING OF ELLEPOTS

CROSS-REFERENCE TO RELATED APPLICATIONS

This application is a National Stage of International Application No. PCT/US2011/028785, filed Mar. 17, 2011, which claims priority to U.S. Provisional Application No. 61/317,977, filed on Mar. 26, 2010. The disclosures of the above applications are incorporated herein by reference in its entirety.

FIELD

The present teachings relate to systems and methods for selecting and breading plants based on genotypic traits.

BACKGROUND

The statements in this section merely provide background information related to the present disclosure and may not constitute prior art.

In plant breeding and selection processes, genotypic data can be gathered by performing DNA analysis on seed specimens then breeding plants based on the analysis. For example, at least one known breeding and selection process involves removing or extracting samples from a plurality of seeds in such a manner that leaves the sampled seeds viable for planting. Subsequently, the sampled seeds are planted in ellepots and allowed to germinate keeping data correlating, or linking, each planted seed with the respective removed sample. Typically, each populated ellepot is marked to link the respective populated ellepot with the corresponding extracted chip and stored in an ellepot tray, e.g., a twenty-four receptacle ellepot tray. The ellepot trays are then placed side-by-side in a controlled growing environment, e.g., a greenhouse, resulting in hundreds or thousands of ellepots populated with germinating seeds being grouped together in the controlled growing environment.

As the planted seeds are germinating in the ellepots, the removed or extracted samples undergo DNA analysis to identify which of the samples, and hence, identify which of the corresponding germinating seeds, have one or more desired genetic traits. After the particular germinating seeds having the one or more desired genetic traits are identified, i.e., selected, the respective ellepots must be located and removed from the hundreds or thousands of populated ellepots within the controlled growing environment. Such known methods involve manually locating the selected ellepots among the hundreds or thousands within the controlled growing environment, removing the selected ellepots from the respective ellepot tray and transferring the selected ellepots to subsequent ellepot trays to be transported to test fields where the selected ellepots are planted for breeding purposes.

Manually locating the selected ellepots, removing them from the ellepot trays and transferring them to subsequent ellepot trays is a labor intensive, time consuming and costly.

SUMMARY

The present disclosure provides systems and methods for identifying and retrieving, from a plurality of populated ellepots, selected ellepots populated with a germinating plant possessing one or more genetic traits.

For example, in various embodiments, the present disclosure provides a method for removing selected ellepots from a plurality of germination ellepot trays and remapping the selected ellepots to a planting ellepot tray. In such embodiments, the method can include placing one of a plurality of germination ellepot trays onto an ellepot ejection dock of an ellepot workstation. Each germination ellepot tray comprises an array of ellepot receptacles having an ellepot disposed in each receptacle, wherein each ellepot is populated with a plant germinating therein. The method can additionally include, acquiring tray information identifying the respective germination ellepot tray, and automatically dislodging one or more selected populated ellepots from the respective germination ellepot tray utilizing the acquired germination ellepot tray information. Subsequently, each dislodged populated ellepot is sequentially transferred from the respective germination ellepot tray to one of a plurality of receptacles of a planting ellepot tray.

In various other embodiments, the present disclosure provides a method for removing selected ellepots from a plurality of germination ellepot trays and remapping the selected ellepots to a planting ellepot tray. In such embodiments, the method can include placing one of a plurality of germination ellepot trays onto an ellepot ejection dock of an ellepot workstation. Each germination ellepot tray comprises an array of ellepot receptacles having an ellepot residing therein, wherein each ellepot is populated with a plant germinating therein. The method can additionally include reading a germination ellepot tray information device disposed on the germination ellepot tray, wherein the tray information device provides information identifying the respective germination ellepot tray. The method can further include, cross referencing the read tray information with predetermined ellepot selection data to identify the location within the array of the respective germination ellepot tray of one or more populated ellepots selected to be removed from the respective germination ellepot tray based on one or more genotypic traits of each respective selected plant. Furthermore, the method can include automatically sequentially actuating one or more of a plurality of ejection devices of an ejection assembly of the ellepot workstation in accordance with the location of the selected populated ellepots to sequentially dislodge each of the selected populated ellepots from the respective germination ellepot tray. Subsequently, each dislodged populated ellepot is sequentially transferred from the respective germination ellepot tray to one of a plurality of receptacles of a planting ellepot tray.

In still other embodiments, the present disclosure provides a system for removing selected ellepots from a plurality of germination ellepot trays and remapping the selected to ellepots to a planting ellepot tray. In such embodiments, the system can include a computer-based remapping control system that is structured and operable to control automated operations of the ellepot workstation, and an ejection dock that is structured to retain selected ones of a plurality of germination ellepot trays. Each germination ellepot tray comprises an array of ellepot receptacles having an ellepot residing therein, wherein each ellepot is populated with a plant germinating therein. The system can additionally include an electronic reading device communicatively connected to the remapping control system, wherein the reading device is structured and operable to read a germination ellepot tray information device disposed on the respective germination ellepot tray to acquire, and communicate to the remapping control system, information identifying the respective germination ellepot tray.

The remapping control system is further operable to cross reference the read tray information with predetermined ellepot selection data stored on an electronic storage device of the remapping control system to identify a location within the array of the respective germination ellepot tray of one or more populated ellepots selected to be removed from the respective germination ellepot tray. The system can still further include an ejection assembly including a plurality of ejection devices. The ejection assembly is disposed beneath the ejection dock and provides a bottom surface of the ejection dock on which the respective germination ellepot tray is supported. The ejection assembly is structured and operable, as controlled by the remapping control system, to automatically sequentially actuate particular ones of the ejection devices, in accordance with the location of the selected populated ellepots, to sequentially dislodge each of the selected populated ellepots from the respective germination ellepot tray.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
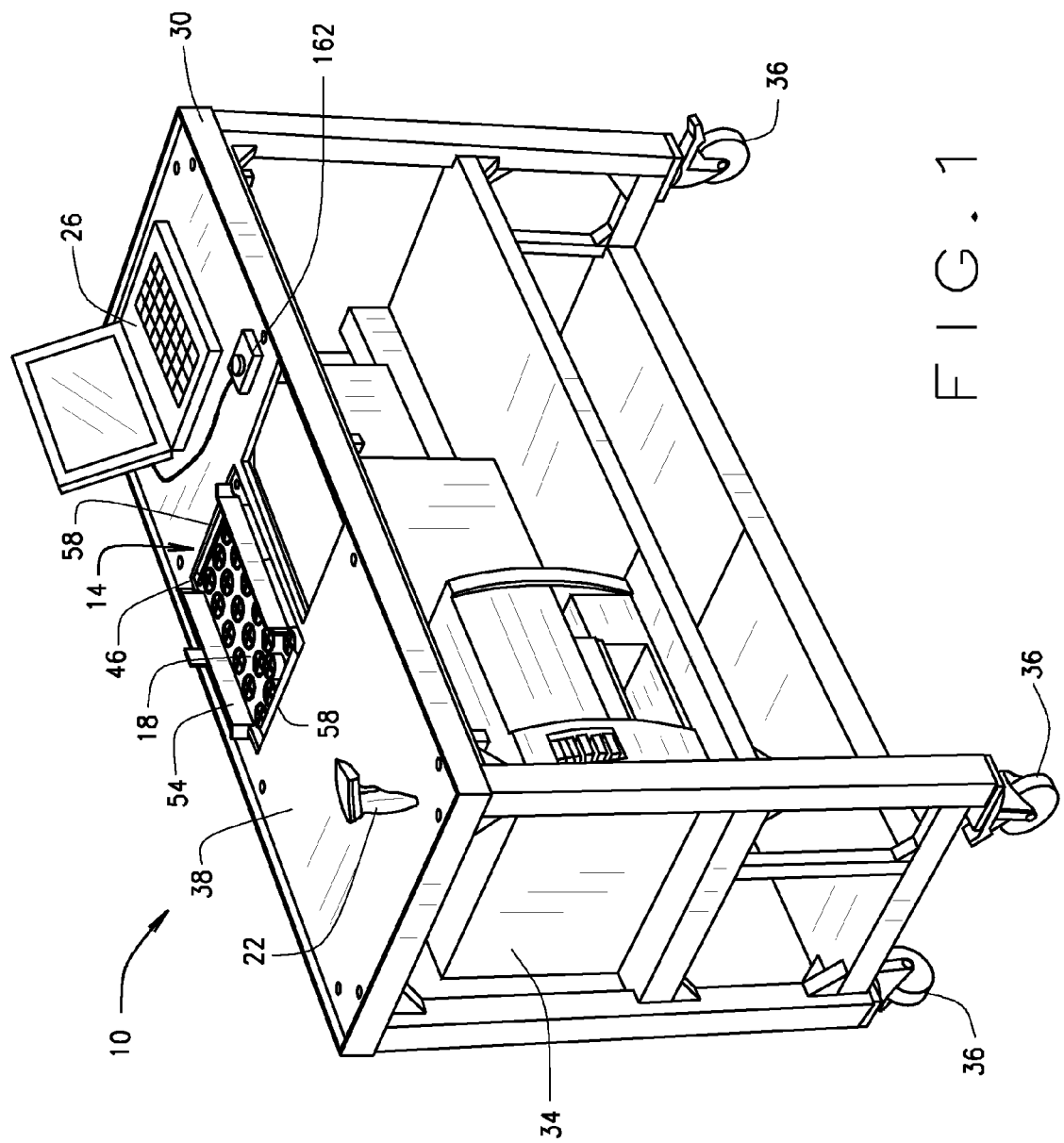
FIG. 1 is an isometric view of an ellepot remapping system 10, in accordance with various embodiments of the present disclosure.

The following description is merely exemplary in nature and is in no way intended to limit the present teachings, application, or uses. Throughout this specification, like reference numerals will be used to refer to like elements.

Referring to FIG. 1, an ellepot remapping system 10 is provided for removing selected ellepots from one or more germination ellepot trays and transferring the selected ellepots to one or more planting ellepot trays. Generally, the ellepot remapping system 10 comprises an ellepot ejection dock 14, an ejection assembly 18, an tray information reading device 22, a computer-based remapping control system 26 and a movable workstation 30 that includes the ellepot ejection dock 14 and is structured and operable to support the ejection assembly 18, the tray information reading device 22, and the computer-based control system 26. In various embodiments, the ellepot remapping system 10 can further include an ellepot identification tag dispenser 34 disposed on or within the workstation 30. The control system 26 is operable to control the automated and cooperative functions and operations of the ellepot ejection assembly 18, and the tray information reading device 22 and the ellepot identification tag dispenser 34, i.e., control the automated operation of the ellepot remapping system 10, as described below.

The workstation 30 is structured to include a worktop 38 having the ellepot ejection dock 14 disposed therein. The ellepot ejection dock 14 is structured to temporarily retain an ellepot tray 42, shown in FIG. 4, during operation of the ellepot remapping system 10. Particularly, the ellepot ejection dock 14 comprises an aperture 46 formed in the workstation worktop 38 and a top plate 50 of the ejection assembly 18, shown in FIG. 3. A perimeter of the aperture 46 is sized and shaped to accommodate an ellepot tray 42 such that the ellepot tray can be placed and retained within the aperture 46.

Figure 2:
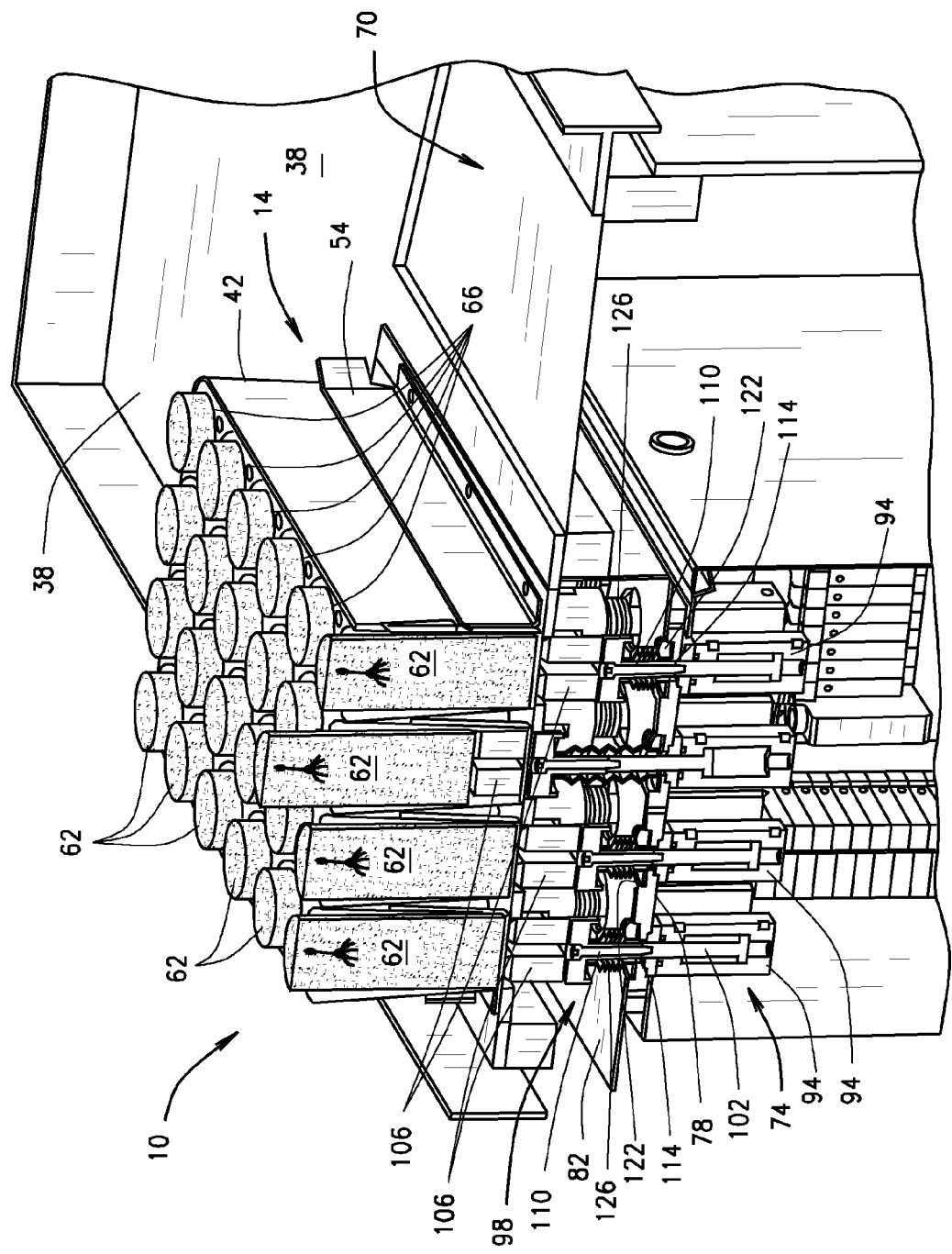
FIG. 2 is a cross sectional isometric view of an ellepot ejection dock of the ellepot remapping system 10, shown in FIG. 1, having an ellepot tray disposed therein, in accordance with various embodiments of the present disclosure.
Figure 3:
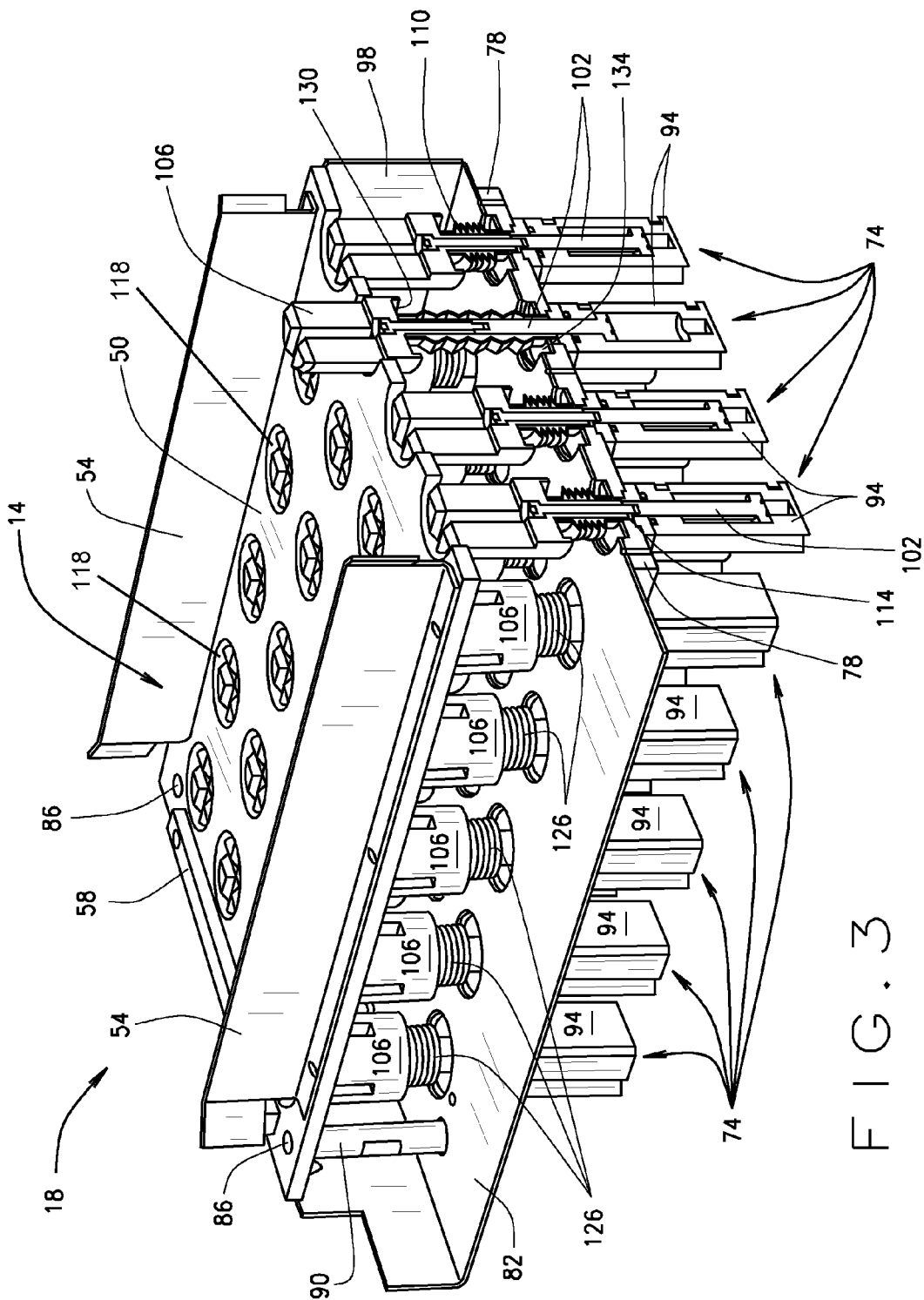
FIG. 3 is an isometric view of an ejection assembly of the remapping system 10, shown in FIG. 1, in accordance with various embodiments of the present disclosure.

Referring now to FIGS. 1, 2 and 3, the ejection assembly 18 is mounted to the workstation worktop 38 within or beneath the aperture 46 such that the ejection assembly top plate 50 provides a bottom surface of the ellepot ejection dock 14 on which the respective ellepot tray 42 is placed during operation of the ellepot remapping system 10, as described herein. In various embodiments, the ellepot ejection dock 14 can include opposing side alignment rails or stops 54 and/or opposing end alignment rails or stops 58 mounted to the ejection assembly top plate 50. The side alignment stops 54 and end alignment stops 58 are structured to align and retain the respective ellepot tray 42 in a particular position, or orientation, within the ellepot ejection dock 14. Particularly, the side alignment stops 54 and end alignment stops 58 are structured to retain the respective ellepot tray 42 within the aperture 46 in a steadfast, i.e. stable and steady, manner. That is, once an ellepot tray 42 is placed in the ejection dock 14, the side alignment stops 54 and end alignment stops 58 prevent the respective ellepot tray 42 from being substantially moved in a longitudinal or lateral direction, i.e., end-to-end or side-to-side, without first lifting the respective ellepot tray 42 away from the side alignment stops 54 and end alignment stops 58.

Figure 4:
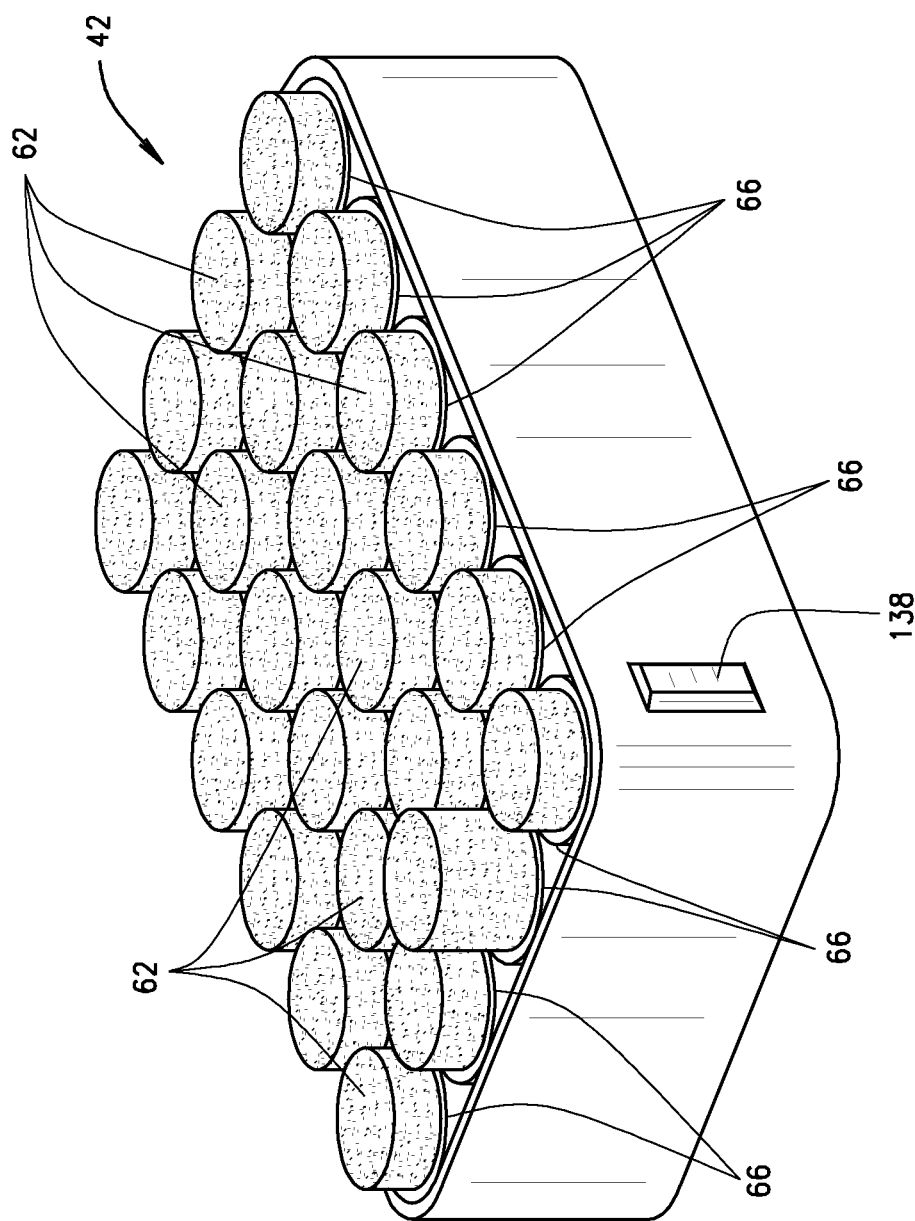
FIG. 4 is an isometric view of an exemplary ellepot tray that is operated on by the remapping system 10, shown in FIG. 1, in accordance with various embodiments of the present disclosure.

Referring now to FIG. 4, the ellepot remapping system 10 is generally structured and operable to sequentially receive selected ones of a plurality of ellepot trays 42 having a plurality of ellepots 62 disposed within a plurality of receptacles 66 of the respective ellepot tray 42 and automatically, i.e. via automation, selectively dislodge, or displace, selected ones of the ellepots 62 from the respective receptacles 66. More particularly, each ellepot tray 42 comprises an array of ellepot receptacles 66, wherein each ellepot receptacle 66 has an ellepot 62 populated with a germinating plant disposed therein. Each ellepot tray 42 has substantially the same perimeter dimensions and includes the same number of receptacles 66. For example, each ellepot tray 42 can comprise twenty-four receptacles 66 configured in a 6×4 array, or thirty-six receptacles 66 configured in a 6×6 array, or any other suitable number of receptacles 66. After each selected ellepot 62 is dislodged from the respective receptacle 66, the selected ellepot 62 is removed from the receptacle 66 and placed into a receptacle 66 of secondary ellepot tray 42, as described below. Subsequently, the selected ellepots 62 are transported to a test field and planted for further breeding and selection.

For clarity, the ellepot trays 42 that have not been operated on by the ellepot remapping system 10 to have the selected ellepots 62 dislodged and removed will be referred to herein as germination ellepot trays 42A. Furthermore, the ellepot trays 42 into which the selected and removed ellepots 62 are placed will be referred to herein as planting ellepot trays 42B. In various embodiments, the ellepot remapping system 10 can further include a planting tray dock 70 structured to temporarily retain a planting ellepot tray 42B on the worktop 38 in a steadfast manner. The planting tray dock 70 can be any structure(s), device(s) or mechanism(s) structured and operable to temporarily retain a planting ellepot tray 42B on the worktop 38 in a substantially steadfast manner. For example, in various embodiments, the planting tray dock 70 can comprise a well, reservoir, or indentation in the worktop 38 that is suitably sized to temporarily retain a planting ellepot tray 42B on the worktop 38 in a substantially steadfast manner.

As described further below, the dislodged ellepots 62 are automatically selected based on one or more genetic traits of the plant germinating within the respective ellepot 62. That is, prior to being planted in the ellepots 62 a plurality of selected seeds have samples, or chips, removed or extracted in such a manner that leaves the sampled seeds viable for planting. Subsequently, the sampled seeds are planted in the ellepots 62 disposed within the receptacles 66 of one or more germination ellepot trays 42A and allowed to germinate keeping information and/or data correlating, or linking, each planted seed with the respective removed sample.

Moreover, as described further below, each populated ellepot 62, or germination ellepot tray receptacle 66, is marked to link the respective populated ellepot 62 with the corresponding extracted sample/chip. The germination ellepot trays 42A are then placed side-by-side in a controlled growing environment, e.g., a greenhouse, resulting in a plurality, e.g., hundreds or thousands, of ellepots 62 populated with germinating seeds being grouped together in the controlled growing environment. As the planted seeds are germinating in the ellepots 62, the removed or extracted samples undergo DNA analysis to identify which of the samples, and hence, identify which of the corresponding germinating seeds, have one or more desired genetic traits. After the particular germinating seeds having the one or more desired genetic traits are identified, i.e., selected, the respective ellepots 62 are located and removed from the plurality of populated germination ellepot trays 42A via the ellepot remapping system 10, as described herein.

Referring now to FIGS. 2 and 3, in various embodiments, the ejection assembly 18 includes the top plate 50, a plurality of ejection devices 74, a mounting plate 78 and a debris shroud 82. The mounting plate 78 is connected to and separated from the top plate 50 via fasteners 86, e.g., bolts, and spacers 90. Each ejection device 74 includes an actuator 94, e.g., a solenoid device, that is mounted to the mounting plate 78 and a dislodging ram 98 that is mounted to a plunger, or shaft, 102 of the respective actuator 94. Each dislodging ram 98 includes a head 106 and a neck 110. Each neck 110 extends through a respective one of an arrayed plurality of holes 114 in the mounting plate 78 and is mounted to a distal end of the respective actuator shaft 102 such that upon activation of any actuator 94, as selected controlled by the control system 26, the respective dislodging ram 98 is extended upward to dislodge a corresponding ellepot from a respective germination ellepot tray 42A.

More particularly, the ejection assembly top plate 50 includes a plurality of holes 118 that are arrayed in the top plate 50 such that the center of each top plate hole 118 coaxially aligns with a corresponding mounting plate hole 114. Moreover, the top plate holes 118 are arrayed in the top plate 50 in a pattern such that each top plate hole 118, and consequently, each mounting plate hole 114, will coaxially align with a corresponding one of a plurality of apertures (not shown) in the bottom of each germination ellepot tray 42A when a germination ellepot tray 42A is placed into the ellepot ejection dock 14. That is, each germination ellepot tray 42A is structured such each ellepot receptacle 66 has a respective aperture that is formed in the bottom that extends through the bottom of the germination ellepot tray 42A. Hence, upon activation of any actuator 94, as selected and controlled by the control system 26, the actuator 94 will extend the respective dislodging ram 98 upward such that the dislodging ram head 106 is extended through the corresponding hole in the bottom of the respective germination ellepot tray 42A, thereby pushing up on and dislodging the corresponding ellepot 62, i.e., the selected ellepot 62, from a respective germination ellepot tray receptacle 66.

Each ejection device 74 is mounted to a bottom side of the mounting plate 78, i.e., the side of the mounting plate 78 facing away from the top plate 50, and the debris shroud 82 is mounted to a top side of the mounting plate 78. The debris shroud 82 also includes a plurality of arrayed holes 122 that coaxially align with the mounting plate holes 114 and is structured to prevent debris, e.g., moisture, dirt, soil or other planting media, from the germination ellepot trays 42A, from fouling the actuators 94 or otherwise impairing the operation of the ejection devices 74. In various embodiments, each ejection device 74 additionally includes a flexible expansion boot 126 fitted around the neck 110 of each respective dislodging ram 98. More specifically, each expansion boot 126 has a top end 130 that is affixed to a bottom of the respective dislodging ram head 106 and an opposing bottom end 134 that is affixed to the mounting plate 78 and/or the debris shroud 82. Each expansion boot top end 130 is affixed to the bottom of the respective dislodging ram head 106 such that a seal is formed between the expansion boot top end 130 and the bottom of the respective dislodging ram head 106 that prevents debris, e.g., moisture, dirt, soil or other planting media from the germination ellepot trays 42A, from fouling the actuators 94 or otherwise impairing the operation of the ejection devices 74. Similarly, each expansion boot bottom end 134 is affixed to the mounting plate 78 and/or the debris shroud 82 such that a seal is formed between each expansion boot bottom end 134 and the mounting plate 78 and/or the debris shroud 82 that prevents debris, e.g., moisture, dirt, soil or other planting media, from the germination ellepot trays 42A, from fouling the actuators 94 or otherwise impairing the operation of the ejection devices 74.

As described further below, the ejection assembly 18 is structured and operable, as controlled by the control system, to automatically sequentially actuate particular ones of the ejection devices 74, in accordance with the location of selected populated ellepots 62 within the respective germination ellepot tray 42A residing in the ejection dock 14, to sequentially dislodge each of the selected populated ellepots 62 from the respective germination ellepot tray 42A.

Referring now to FIGS. 1 and 4, each germination ellepot tray 42A includes an information device 138 affixed thereto. Each information device 138 provides information and/or data regarding or pertaining to the respective germination ellepot tray 42A. For example, in various embodiments, each information device 138 can provide information and/or data identifying the respective germination ellepot tray 42A. Additionally, in various embodiments, each information device 138 can further provide information and/or data identifying each ellepot 62 disposed within the respective germination ellepot tray 42A, particularly the plant germinating within each respective ellepot 62, and the location of each particular plant/ellepot 62 disposed within the respective germination ellepot tray 42A, i.e., the location of the receptacle 66 within the array or receptacles 66 in which each respective ellepot 62 is disposed.

The tray information reading device 22 is communicatively connected, wired or wirelessly, to the control system 26 and is structured and operable to electronically read, or scan, the germination ellepot tray information device 138 of the respective germination ellepot tray 42A that has been placed in, or is about to be placed in, the ejection dock 14 to acquire, and communicate to the control system 26, the information and/or data provided by the respective germination ellepot tray information device 138. More particularly, as described further below, upon placing each respective germination ellepot tray 42A into the ejection dock 14, the respective information device 138 is read using the tray information reading device 22. The tray information reading device 22 then communicates the read information/data to the control system 26, whereupon the read information/data is utilized as data inputs to one or more remapping system control algorithms, or programs, executed by the control system 26 to control the operation of the ejection assembly 18 to dislodge selected ellepots 62 from their respective receptacles 66.

For example, in various embodiments, based on information identifying the respective germination ellepot tray 42A, as read from the respective information device 138, the control system 26 executes the remapping system control algorithm(s) to access data stored in the control system 26, or alternatively provided by the respective information device 138, in order to identify particular ellepots 62 within the identified germination ellepot tray 42A that contain particular plants having one or more desired genetic attributes or characteristics, i.e., selected plants/ellepots 62. The control system 26 then actuates particular ejection devices 74 of the ejection assembly 18 that correspond to the selected ellepots 62 to dislodge the selected ellepots 62 from their respective receptacles 66, whereafter each dislodged ellepot 62 is removed and transferred to the planting ellepot tray 42B.

Each germination ellepot tray information device 138 can be any machine-readable information device, label or tag suitable for containing, storing or providing information and/or data, readable or retrievable by the tray information reading device 22 regarding or pertaining to the respective germination ellepot tray 42A and/or each ellepot 62 disposed within the respective germination ellepot tray 42A, particularly the plant germinating within each respective ellepot 62, and/or the location of each particular plant/ellepot 62 disposed within the respective germination ellepot tray 42A, i.e., the location of the receptacle 66 within the array or receptacles 66 in which each respective ellepot 62 is disposed. For example, in various implementations, each information device 138 can comprise a two-dimensional matrix code or other machine-readable label, tag or device, such as a radio frequency identification (RFID) tag or a barcode label, from which the information/data can be retrieved and interpreted via wireless communication such as optical signals, e.g., infrared signals, or magnetic fields.

Similarly, the tray information reading device 22 can be any device suitable for reading the germination ellepot tray information devices 138, i.e., retrieving the information/data contained in or provided by each respective information device 138, and communicating the retrieved information/data to the control system 26. For example, in various implementations, the tray information reading device 22 can comprise a device structured and operable to read a two-dimensional matrix code or other machine-readable label, tag or device, such as an RFID tag reader or a barcode label reader, operable to read the information/data stored in or provided by the respective germination ellepot tray information device 138 via wireless communication such as optical signals, e.g., infrared signals, or magnetic fields.

Referring now to FIG. 1, as described above, in various embodiments, the ellepot remapping system 10 can include an ellepot identification tag dispenser 34. The ellepot identification tag dispenser 34 is communicatively connected to the control system 26 and is structured and operable, as controlled by the control system 26, to provide an ellepot identification tag 142 for each selected ellepot 62 as each selected ellepot 62 is dislodged from the respective germination ellepot tray 42A. More particularly, concurrently with each selected ellepot 62 being dislodged from the respective germination ellepot tray 42A, i.e., just prior to, substantially simultaneously with, or just subsequent to each selected ellepot 62 being dislodged, the ellepot identification tag dispenser 34, as controlled by the controls system 26, prints, codes or programs and dispenses an ellepot identification tag 142. Each ellepot identification tag 142 is printed, coded or programmed to provide information identifying the concurrently dislodged ellepot 62, or more particularly, identifying the particular plant germinating within concurrently dislodged ellepot 62. For example, each ellepot identification tag 142 can provide information and/or data regarding one or more genetic characteristics or traits of the respective germinating plant, as provided by predetermined ellepot selection information and/or data stored in the control system 26.

Hence, once a selected germination ellepot tray 42A is placed in the ejection dock 14 and the respective germination ellepot tray information device 138 is read/scanned, via the tray information reading device 22, the control system 26 utilizes the germination ellepot tray information to dislodge selected ellepots 62, via operation of the ejection assembly 18, as described above. Concurrent with activating each particular ejection device 74 to dislodge each respective selected ellepot 62, the control system communicates information identifying the respective germinating plant/ellepot 62 and instructs the ellepot identification tag dispenser 34 to print, code or program and dispense an ellepot identification tag 142 that provides the respective germinating plant/ellepot identification information. Each dispensed ellepot identification tag 142 can then be inserted into the respective ellepot 62 or placed in a planting ellepot tray receptacle 66 along with the respective dislodged and removed ellepot 62, and thereafter placed in the ground adjacent where each respective ellepot 62 is planted in a test field for further screening and analysis.

Each ellepot identification tag 142 can be any machine-readable identification device, label or tag suitable for containing, storing or providing information and/or data, readable or retrievable by ellepot identification tag reading device (not shown), e.g., a device similar the tray information reading device 22, regarding or pertaining to the respective plant/ellepot 62, particularly information and/or data regarding one or more genetic characteristics or traits of the respective plant. For example, in various implementations, each ellepot identification tag 142 can comprise a two-dimensional matrix code or other machine-readable label, tag or device, such as a radio frequency identification (RFID) tag or a barcode label, from which the information/data can be retrieved and interpreted via wireless communication such as optical signals, e.g., infrared signals, or magnetic fields.

Figure 6:
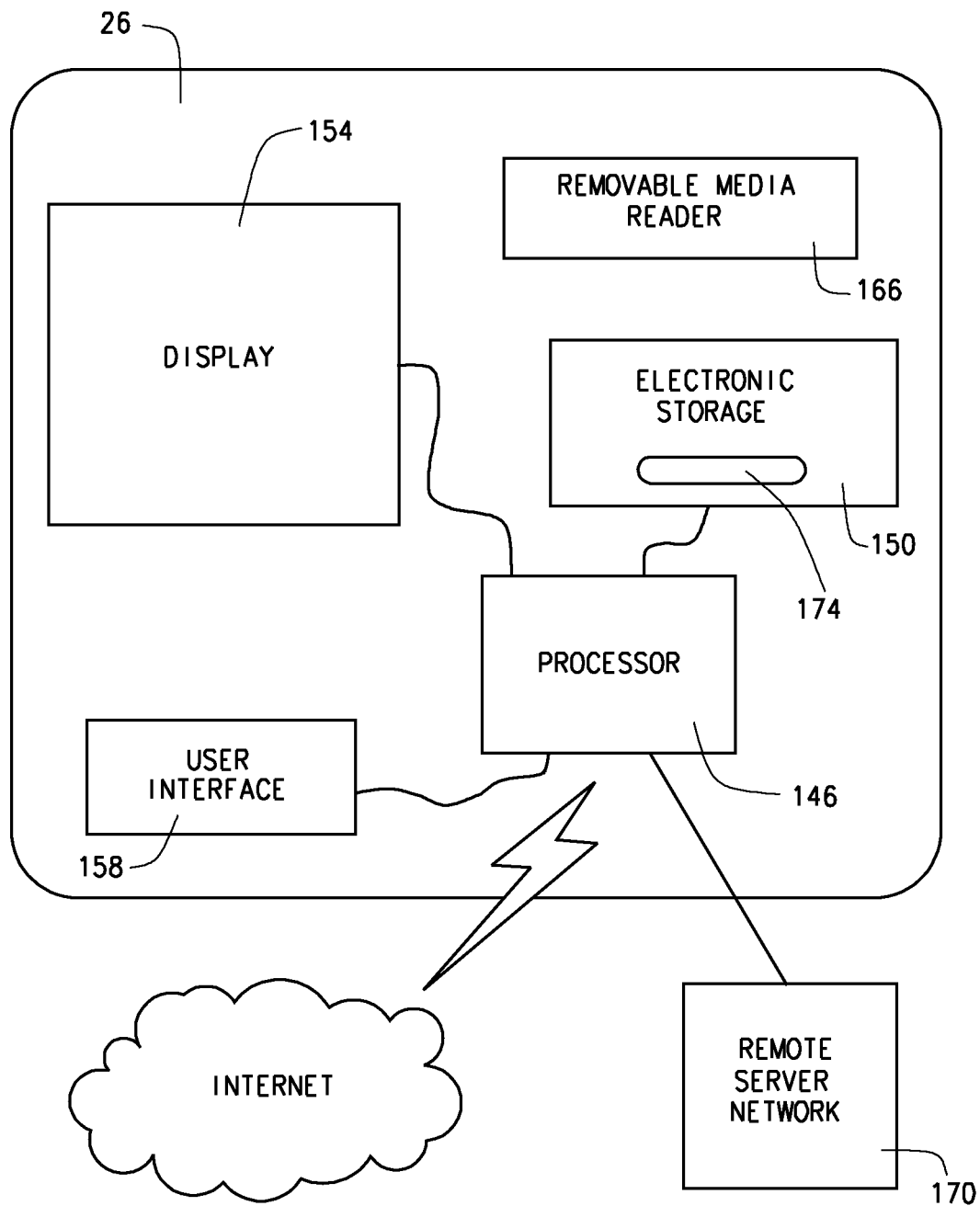
FIG. 6 is a block diagram of a remapping control system of the ellepot remapping system 10, in accordance with various embodiments of the present disclosure.

Referring now to FIG. 6, in various embodiments, the control system 26 is a computer based system that generally includes at least one processor 146 suitable to execute all functions of control system 26 to automatically, or robotically, control the operation of the ellepot remapping system 10, as described herein. The control system 26 additionally includes at least one electronic storage device 150 that comprises a computer readable medium, such as a hard drive or any other electronic data storage device for storing such things as remapping system control algorithms, software packages or programs, and digital information, data, look-up tables, spreadsheets and databases. Furthermore, the control system 26 includes a display 154 for displaying such things as information, data and/or graphical representations, and at least one user interface device 158, such as a keyboard, mouse, stylus, command button, and/or an interactive touchscreen on the display 154. For example, in various embodiments, the control system 26 can include a user interface device 158 comprising the tray information reading device 22 that is communicatively connected to the processor, via either a wired or wireless connection.

Figure 5:
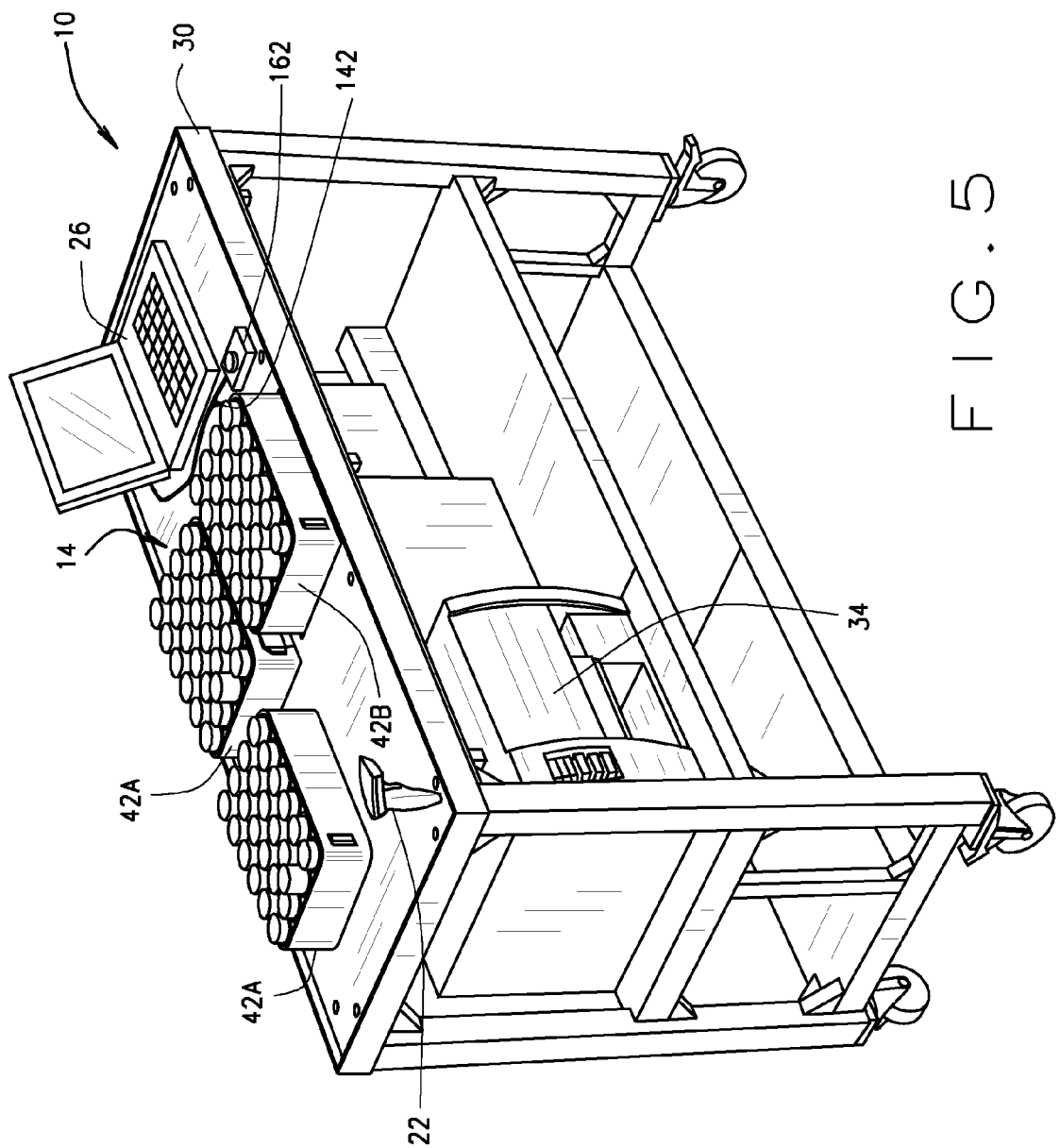
FIG. 5 is an isometric view of the ellepot remapping system 10, shown in FIG. 1, including a germination ellepot tray and a planting ellepot tray, in accordance with various embodiments of the present disclosure.

Additionally, in various embodiments, the control system 26 can include another user interface device 158 comprising an operation actuation control 162 (exemplarily shown in FIGS. 1 and 5) that is communicatively connected to the processor 146, via either a wired or wireless connection, to provide command/selection inputs to the remapping system control algorithm(s) being executed during operation of the ellepot remapping system 10, as described below. For example, the operation actuation control 162 can be operable to selectively command operation of the ejection assembly 18 to sequentially dislodge the selected ellepots 62, as described below.

In various embodiments the control system 26 can further include a removable media reader/writer 166 for reading information and data from and/or writing information and data to removable electronic storage media such as floppy disks, compact disks, DVD disks, zip disks, flash drives or any other computer readable removable and portable electronic storage media. In various embodiments the removable media reader 166 can be an I/O port of the control system 26 utilized to read external or peripheral memory devices such as flash drives or external hard drives.

In various embodiments, the control system 26, i.e., the processor 146 can be communicatively connectable to a remote server network 170, e.g., a local area network (LAN), via a wired or wireless link. Accordingly, the control system 26 can communicate with the remote server network 170 to upload and/or download data, information, algorithms, software programs, and/or receive operational commands. Additionally, in various embodiments, the control system 26 can be structured and operable to access the Internet to upload and/or download data, information, algorithms, software programs, etc., to and from Internet sites and network servers.

Furthermore, in various embodiments, the control system 26 can include one or more remapping system control algorithms, or programs 174, stored on the electronic storage device 150 and executed by processor 146. The one or more remapping system control algorithms utilize predetermined ellepot selection data indicating the selected ellepots 62 to be removed from particularly identified germination ellepot trays 42A (the respective identified germination ellepot trays 42A containing the selected ellepots 62) and the receptacles 66 within the respective germination ellepot trays 42A in which each selected ellepot 62 is disposed.

As described above, the ellepot remapping system 10 is structured and operable to dislodge selected ellepots 62, i.e., ellepots 62 populated with selected germinating plants, from each of a plurality of the germination ellepot trays 42A utilizing selection data stored in the control system 26 that has been compiled based on one or more genetic traits of each selected germinating plant. The selection data can be compiled using any method and/or means suitable for obtaining genetic data for a plurality of seeds, linking the genetic data for each seed to the respective seed and tracking each seed as each seed is planted in a respective ellepot 62 and allowed to germinate. Then based on analysis of the genetic data, particular germinating seeds/plants can be selected for further breeding, screening and analysis. In which case, the ellepots 62 containing the selected germinating plants can be located, removed from the respective germination ellepot trays 42A and transferred to planting ellepot trays 42B utilizing the ellepot remapping system 10, as described herein.

For example, in various exemplary embodiments, the selection data can be compiled by removing or extracting samples, i.e., tissue samples, of a plurality of seeds selected for testing. The samples are removed/extracted in such a manner as to leave each respective sampled seed viable for planting. Each extracted sample is placed into a sample collection device, e.g., a twenty-four well sample collection tray. Similarly, each sampled seed is placed into a seed collection device, e.g., a twenty-four well seed collection tray. Moreover, data is created linking each sampled seed to the respective extracted sample such that the sample-to-seed correlation of each sampled seed and respective sample can be tracked and maintained as each sample is analyzed and each sampled seed is planted in an ellepot 62, as described below.

For example, in such exemplary embodiments, as each seed is sampled, the particular sample collection device in which the respective sample is collected, and the particular location of the respective sample within the particular sample collection device, e.g., the well location of respective sample within the particular sample collection device, is recorded and stored in a sample-to-seed database. Concurrently, as each seed is sampled, the particular seed collection device in which the respective sampled seed is collected, and the particular location of the respective sampled seed within the particular seed collection device, e.g., the well location of the respective sampled seed within the particular seed collection device, is recorded and stored in the sample-to-seed database. The sample-to-seed database can be external to the remapping control system 26, or the sample-to-seed database can reside on/in the electronic storage device 150 of the control system 26.

Once the seeds have been sampled and the sampled seeds have been collected in the sample collection devices, the sample seeds are taken to a controlled growing environment, e.g., a greenhouse, where each sampled seed is individually removed from the respective sample collection device and planted in a respective one of the ellepots 62 within one of the germination ellepot trays 42A. Additionally, data is created linking each planted seed, i.e., each ellepot 62 populated with a seed, to the corresponding extracted sample. For example, in various embodiments, data from the sample-to-seed database can be utilized to link the location within the particular germination ellepot tray 42A of the receptacle 66 retaining each respective seed/ellepot 62 with the sample extracted from each respective seed. Consequently, a sample-to-populated ellepot database can be created. The sample-to-populated ellepot database can be external to the remapping control system 26, or the sample-to-populated ellepot database may reside on/in the electronic storage device 150 of the control system 26.

The data for the sample-to-populated ellepot database, i.e., data linking each seed/ellepot 62 to the corresponding extracted sample, can be obtained using any suitable process. For example, in such exemplary embodiments, a tray information device reader, such as the tray information reading device 22, can be employed to read, or scan, the germination ellepot tray information device 138 of each germination ellepot tray 42A prior to planting each seed in an ellepot 62 disposed within the respective germination ellepot tray 42A. Then, the location of the seed/ellepot 62, i.e., the location of the respective receptacle 66, within the particular germination ellepot tray 42A can be recorded. Thereafter, data from the sample-to-seed database can be utilized to generate data linking each extracted sample to the location of the respective seed/ellepot 62 within a particular germination ellepot tray 42A, thereby generating the sample-to-populated ellepot database.

The germination ellepot trays 42A are then placed in a controlled growing environment, e.g., a greenhouse, where the seeds are allowed to germinate. As the planted seeds are germinating in the ellepots 62, the removed or extracted samples can be genetically analyzed, e.g., undergo DNA analysis, to identify which of the samples have one or more desired genetic traits. Then, using the sample-to-populated ellepot database, the particular germinating seeds (or now germinating plants) corresponding to the samples identified to have one or more desired genetic traits can be identified. That is, the particular germinating plants having one or more desired genetic traits can be identified. More particularly, the particular germination ellepot trays 42A and the location within those germination ellepot trays 42A of each identified germinating plant can be identified. The germinating plants identified to have one or more desired genetic traits are referred to herein as the selected plants and/or the selected ellepot 62.

Subsequently, a selected plant table, database or list is compiled and provided to the remapping control system 26. That is, the selected plant table can be downloaded and stored in/on the electronic storage device 150 of the control system 26, via connection with the remote server network 170, the Internet, and/or a removable electronic storage device having the selected plant table stored therein/thereon. Or, the selected plant table can be accessed by the control system 26 via connection to a removable electronic storage device, the remote server network 170, and/or the Internet having the selected plant table stored therein/thereon. The selected plant table includes a listing of all the selected plants, the corresponding germination ellepot trays 42A in which each selected plant resides (i.e., a corresponding tray ID number), and the location within the respective germination ellepot trays 42A of each selected plant.

Once the selected plant table has been stored in/on the electronic storage device 150 or accessed by the control system 26 some or all of the germination ellepot trays 42A in the controlled growing environment are individually placed in the ellepot ejection dock 14. Concurrent to, i.e., just prior to, just subsequent to or substantially simultaneously with, placing a particular germination ellepot tray 42A into the ejection dock 14, the tray information reading device 22 is used to read/scan the respective germination ellepot tray information device 138. As described above, the tray information reading device 22 communicates the tray information and/or data to the control system 26 where execution of the remapping system control algorithm(s) compares, contrasts, or correlates the tray information and/or data with the information stored in the selected plant table. For example, via execution of the remapping system control algorithm(s), the selected plant table can be searched for the tray ID number provided by the scanned germination ellepot tray information device 138.

If the respective tray ID number is not located within the selected plant table, the control system 26, via execution of the remapping system control algorithm(s), can display a message on the display 154, or give any other suitable notification, indicating that the germination ellepot tray 42A currently residing in the ejection dock 14 does not contain any selected plants/ellepots 62. In which case, the particular germination ellepot tray 42A is removed from the ejection dock 14 and a subsequent germination tray is placed in the ejection dock 14, the respective germination ellepot tray information device 138 is read/scanned and the selected plant table is searched for the respective tray ID number.

If a particular tray ID number is located in selected plant table, the control system 26, via execution of the remapping system control algorithm(s), can display a message on the display 154, or give any other suitable notification, indicating that the germination ellepot tray 42A currently residing in the ejection dock 14 contains one or more selected plants/ellepots 62. In which case, an operator can utilize the operation actuation control 162, or any other suitable user input device, to input an actuation signal to the control system 26. The actuation signal instructs the remapping system control algorithm (s) to interpret the data stored in the selected plant table that corresponds to the located tray ID number to determine the location within the respective germination ellepot tray 42A of a particular selected plant/ellepot 62. Then, via execution of the remapping system control algorithm(s), the control system 26 actuates a particular ejection device 74 to dislodge the respective selected plant/ellepot 62, as described above.

The dislodged selected plant/ellepot 62 is then removed from the respective germination ellepot tray 42A and transferred to a planting ellepot tray 42B. Concurrent to transferring the selected plant/ellepot 62 to the planting ellepot tray 42B the control system 26 instructs the ellepot identification tag dispenser 34, via execution of the remapping system control algorithm(s), to provide an ellepot identification tag 142 identifying the selected plant/ellepot 62. As described above, the ellepot identification tag 142 is then inserted into the respective ellepot 62 or placed in a planting ellepot tray receptacle 66 along with the respective dislodged and removed ellepot 62.

Once a selected plant/ellepot 62 has been transferred to the planting ellepot tray 42B, the operator can utilize the operation actuation control 162, or other suitable user input device, to input another actuation signal to the control system 26. The actuation signal instructs the remapping system control algorithm(s) to interpret the data stored in the selected plant table to determine whether the respective germination ellepot tray 42A contains any other selected plants/ellepots 62, i.e., subsequent selected plants/ellepots 62. If so, the control system 26 actuates, via execution of the remapping system control algorithm(s), another particular ejection device 74 to dislodge a respective subsequent selected plant/ellepot 62. Thereafter, a respective subsequent ellepot identification tag 142 is dispensed from the ellepot identification tag dispenser 34 and the subsequently selected plant/ellepot 62 is transferred to the planting ellepot tray 42B along with the respective subsequent ellepot identification tag 142.

The process is repeated until all the selected plants/ellepots 62 of the particular germination ellepot tray 42A have been dislodged and transferred to a planting ellepot tray 42B. Once, there are no more selected plants/ellepots 62 within a particular germination ellepot tray 42A the control system 26, via execution of the remapping system control algorithm(s), can display a message on the display 154, or give any other suitable notification, indicating that all the selected plants/ellepots 62 within the particular germination ellepot tray 42A currently residing in the ejection dock 14 have been dislodged for removal and transfer to the planting ellepot tray 42B. The particular germination ellepot tray 42A is then removed, another subsequent germination ellepot tray 42A is placed in the ejection dock 14, and the process is repeated until all of the selected plants/ellepots 62 listed in the selected plant table have been removed from the plurality of germination ellepot trays 42A and transferred to planting ellepot trays 42B, as described above.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for removing selected ellepots from a plurality of germination ellepot trays and remapping the selected ellepots to a planting ellepot tray, said method comprising:

placing one of a plurality of germination ellepot trays onto an ellepot ejection dock of an automated ellepot remapping system, each germination ellepot tray comprising an array of ellepot receptacles, each ellepot receptacle comprising an aperture in the bottom thereof and having an ellepot disposed therein, each ellepot populated with a plant germinating therein;

acquiring tray information identifying the respective germination ellepot tray;

automatically, via operation of an ejection assembly of the ellepot remapping system, dislodging upward and retaining one or more selected populated ellepots within the respective germination ellepot receptacle utilizing the acquired germination ellepot tray information, wherein automatically dislodging comprises:

actuating one or more of a plurality of ejection devices of the ejection assembly such that a dislodging ram head of each respective ejection device is extended upward through the respective ellepot receptacle aperture, whereby the respective populated ellepot is pushed upward and dislodged and retained within the respective ellepot receptacle; and removing each dislodged populated ellepot from the respective populated ellepot receptacle and transferring each populated ellepot from the respective germination ellepot tray to one of a plurality of receptacles of a planting ellepot tray.

2. The method of claim 1, wherein acquiring the tray information comprises reading a germination ellepot tray information device disposed on the germination ellepot tray, the tray information device providing the tray information identifying the respective germination ellepot tray.

3. The method of claim 2, wherein automatically dislodging one or more selected populated ellepots from the respective germination ellepot tray utilizing the acquired germination ellepot tray information comprises cross referencing the read tray information with predetermined selection data to identify the location within the array of the respective germination ellepot tray of the one or more populated ellepots selected to be removed from the respective germination ellepot tray.

4. The method of claim 3, wherein reading the germination ellepot tray information device comprises electronically reading the germination ellepot tray information device and communicating the read tray information to a computer-based ellepot remapping control system.

5. The method of claim 4, wherein cross referencing the read tray information with the predetermined selection data comprises:

accessing the selection data, the selection data including:

information identifying which plants within each germination ellepot tray are selected to be transferred to the planting ellepot tray; and information identifying the location of each selected plant within the array of each respective germination ellepot tray; and cross referencing, via the ellepot remapping control system, the read tray information with the selection data to identify selected populated ellepots disposed within the respective germination ellepot tray that are to be transferred to the planting ellepot tray, and to identify the location of each selected populated ellepot within the array of the respective germination ellepot tray.

6. The method of claim 5, wherein automatically dislodging further comprises actuating an actuator of each respective ejection device in accordance with the identified location of the selected populated ellepots, thereby extending a respective dislodging ram head upward through the respective ellepot receptacle aperture such that the respective populated ellepot is pushed upward and dislodged and retained with the respective ellepot receptacle.

7. The method of claim 1 further comprising associating an ellepot identification tag with each selected populated ellepot as the respective selected populated ellepot is transferred to the planting ellepot tray, each ellepot identification tag providing information identifying the plant germinating within the respective ellepot.

8. The method of claim 7, wherein associating an ellepot identification tag with each selected populated ellepot as the respective selected populated ellepot is transferred to the planting ellepot tray comprises:

automatically printing each ellepot identification tag as the respective selected populated ellepot is being dislodged from the respective germination ellepot tray; and combining each printed ellepot identification tag with the corresponding selected populated ellepot within the respective receptacle of the planting ellepot tray in which the respective selected populated ellepot is placed.

* * * * *